Figure 2:
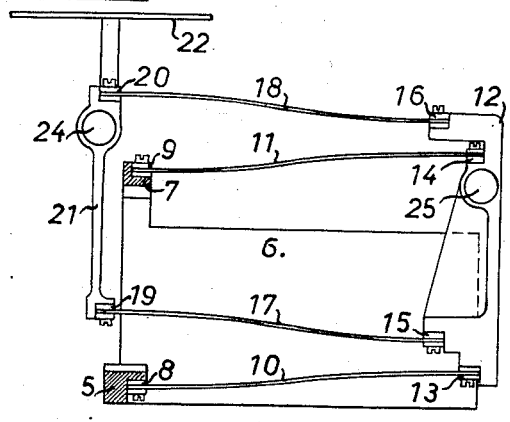

Jan. 24, 1961     M. K. APPIUS     2,969,228

SPRING BALANCE

Filed Dec. 29, 1958

INVENTOR:
Max Karl Appius
BY:
Pierce, Scheffler & Parker
ATTORNEYS.

United States Patent Office 2,969,228
Patented Jan. 24, 1961

2,969,228
SPRING BALANCE

Max Karl Appius, Rapperswil, Switzerland, assignor to Erhard Mettler, Zurich, Switzerland Filed Dec. 29, 1958, Ser. No. 783,239

Claims priority, application Switzerland Apr. 2, 1958

4 Claims. (Cl. 265—63)

This invention relates to spring balances and more particularly to spring balances having a plurality of leaf springs.

Spring balances are known in which the support for the scale pan is attached to an intermediate member by means of two superposed leaf springs by which they are guided parallel to said member. The intermediate member is in turn guided parallel to the frame of the balance with the aid of two further leaf springs and is attached to the frame. The leaf springs extending on one side from the intermediate member to the pan support and on the other side to the frame of the balance are all of equal length and are arranged one beneath the other so that the scale pan can execute an approximately rectilinear vertical movement. Horizontally extending clamping locations for the normally plane leaf springs are provided on the scale pan support, on the intermediate member and on the frame. When the scale pan is unloaded, the leaf springs are accordingly all bent slightly downwardly so that they assume the shape of a very flat S. When the scale pan is loaded to a maximum, the leaf springs are increasingly bent and are accordingly more decidedly S-shaped between their horizontal clamping locations. The scale pan, on which are laid the articles to be weighed is rigidly connected to the scale pan support and is generally located above the uppermost leaf spring. Depending on the position at which the article to be weight is laid on the scale pan, the leaf springs are not only loaded in pure bending but also in torsion, compression or tension to a varying degree. This additional loading, which varies according to the position of the article to be weighed, is also a source of some errors and causes a considerable loss in the accuracy of the spring balance. The maximum loss in accuracy occurs when the balance is loaded to a maximum. As aforementioned, at this maximum loading the leaf springs are bent to a pronounced S-shape and are therefore very sensitive to torsion, compression or tension.

The aim of the present invention is to increase the accuracy of a spring balance in which the support for the scale pan is fastened to an intermediate member and is guided in parallel thereto by means of a plurality of leaf springs and in which the intermediate member is in turn fastened to the frame of the balance and guided parallel thereto by means of a further plurality of leaf springs. Objects of the invention are to provide, in a spring balance of the type stated, leaf springs acting between said scale pan support and said intermediate member and leaf springs acting between said intermediate member and said frame of the balance which are each pre-bent in such a way that when the scale pan is unloaded they are curved to an S-shape to a degree such that at maximum load on the scale pan they are at least approximately flat. Another object of the invention is a spring balance of the kind outlined, wherein the places where said leaf springs are clamped to the scale pan support lie higher at no load on the scale pan than the places where the individual leaf springs are clamped to the intermediate member; in an analogous way, the clamping locations on the intermediate member for the leaf springs acting between the intermediate member and said frame should be higher than their clamping locations on the frame. A further object of the invention is a spring balance of the kind stated, wherein at maximum load on the scale pan, the leaf springs acting between the scale pan support and the intermediate member and those between the intermediate member and the frame of the balance extend approximately horizontally, a horizontally extending clamping location being provided on the pan support, on the intermediate member and on the frame.

Figure 1:
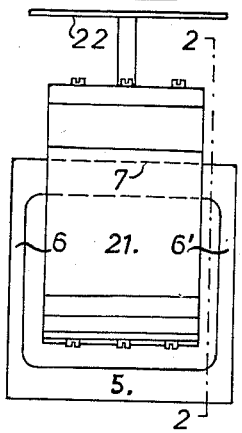
Figure 4:
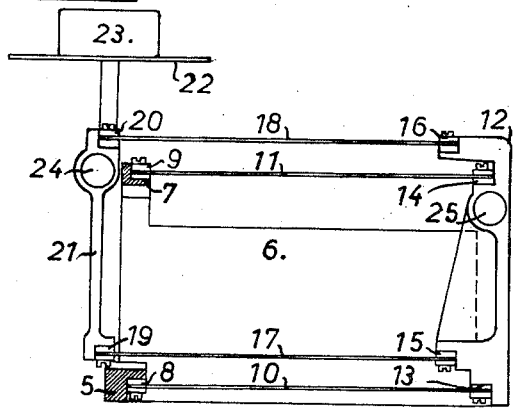
Figure 3:
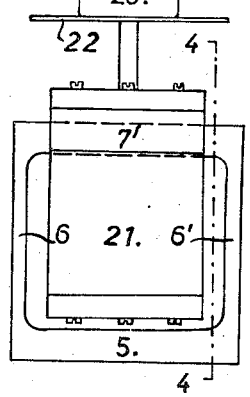

These and other objects and the advantages of the invention will best be understood from the following description of a specific embodiment when read in connection with the accompanying drawing in which:

Fig. 1 is a front view of the scale pan support of the spring balance at no load on the scale pan, Fig. 2 is a vertical section through 2—2 in Fig. 1, Fig. 3 is a front view of the scale pan support at maximum load on the scale pan, and Fig. 4 is a vertical section through 4—4 in Fig. 3.

The frame of the balance comprises a base 5 having a U-shaped supporting surface and upstanding side walls 6, 6'. The side walls are rigidly interconnected by an upper cross bar 7 which extends horizontally and parallel to the shorter central limb of the base 5. At the said central limb and at the cross bar 7, clamping locations 8 and 9 are provided for the two leaf springs 10 and 11 which carry a movable intermediate member 12. The latter carries first and second clamping locations 13, 14, respectively, for the two leaf springs 10 and 11 which are of equal length. The vertical spacings between the clamping locations 8, 9 and between the clamping locations 13, 14 are also equal so that the clamping locations 8, 9, 13, 14 lie at the corners of a parallelogram and the intermediate member 12 is guided parallel to its original position by the springs 10, 11.

The intermediate member 12 has two other (third and fourth) clamping locations 15 and 16 for two leaf springs 17 and 18 extending above the springs 10 and 11 respectively, and also of equal length. The other ends of the leaf springs 17, 18 are fixed in the clamping locations 19, 20 of a pan support 21 in such a way that the locations 15, 16, 19, 20 lie at corners of another parallelogram and the pan support 21 is guided parallel to the intermediate member 12 by the springs 17 and 18. Above the uppermost leaf spring 18 there extends the scale pan 22 which can be rigidly fastened to the pan support 21. In Figs. 1 and 2, the scale pan 22 is not loaded but in Figs. 3 and 4 it carries a weight 23 corresponding to the maximum permissible weight.

The clamping locations 8, 9 on the frame 5, 6, 7, the clamping locations 19, 20 on the pan support 21 and the clamping locations 13, 14 and 15, 16 on the intermediate member 12 should extend horizontally as shown per se, so that the clamped ends of the leaf springs 10, 11 and 17, 18 extend horizontally.

In contrast to known spring balances of the kind referred to, the leaf springs 17, 18 are pre-bent so that when the pan 22 is unloaded (Fig. 2) they are curved to the shape of an S in a way such that the clamping locations 18, 20 at the pan support 21 lie higher than the corresponding clamping locations 15, 16 on the intermediate member 12. Similarly the leaf springs 10, 11 are pre-bent to an S, the clamping locations 13, 14 on the intermediate member 12 lying higher than the clamping locations 8, 9 for these leaf springs on the frame 5, 6, 7. This S-shaped pre-bending of the leaf springs 10, 11 and 17, 18 is of such a degree that at maximum loading of the pan 22 (Fig. 4) all the leaf springs are as flat and horizontal as possible. If the leaf springs 10, 11, 17, 18 are equally dimensioned, i.e. equally long, wide and thick and if they are made from the same material, then the above mentioned condition can be carried out only if the leaf springs 10, 11 are pre-bent to a more pronounced S than the leaf springs 17, 18 because the latter only have to carry the pan 22 and the pan support 21 but the leaf springs 10, 11 must carry the pan 22, the pan support 21, the leaf springs 17, 18 and the intermediate member 12. If the deflections of the leaf springs 10, 11 are to be equal to those of the leaf springs 17, 18 irrespective of the load on the pan 22, then they must be more S-shaped in the dismantled condition.

The leaf springs 10, 11 and 17, 18 should therefore be pre-bent very accurately so that they have the required S-shape when assembled. For manufacturing reasons it has been proved preferable to pre-bend the leaf springs 10, 11 and 17, 18 a few percent more intensively S-shaped than necessary and to provide means on the pan support 21 and on the intermediate member 12 for receiving adjusting weights. These means can be recesses or drilled holes 24 and 25 in the pan support 21 and in the intermediate member 12. After assembly, adjusting weights can be inserted in the holes 24 and 25 until the leaf springs 10, 11 and 17, 18 are as S-shaped as desired at no load on the pan 22. When the spring balance is then adjusted by means of such adjusting weights so that the S-shape of the leaf springs 17, 18 is identical to that of the leaf springs 10, 11 and so that this S-shape results in a predetermined deflection of the leaf springs; then, at any load on the pan 22, the pan support 21 will execute a truly vertical rectilinear movement, the leaf springs 10, 11, 17, 18 being parallel to one another and horizontal at maximum load on the pan 22.

The rectilinear movement of the pan support 21 permits graduated plates or the like to be provided on the pan support 21 which can be viewed by a stationary optical magnifying device, on the cross bar 7 for example, for reading the weight of the article on the pan 22. The accuracy of the weight reading by the spring balance as described is substantially independent of the position of the article on the pan 22. This improvement in accuracy is achieved because with increasing load on the pan 22, the leaf springs 10, 11 and 17, 18 assume a flatter S-shape and become less sensitive to torsion, compression or tension. Torsion, compression or tension is developed, however, if the article to be weighed is placed on the pan 22 eccentrically rather than centrally. At maximum load (Figs. 3 and 4) there is the least sensitivity to torsion, compression and tension because the leaf springs 10, 11, 17, 18 are then flat.

The manufacture of the pre-bent leaf springs 10, 11, 17, 18 presents no significant difficulties if the balance is provided as described, with means 24 and 25 for receiving adjusting weights. Firstly, four equally long, wide and thick flat leaf springs are made from suitable spring steel or other heat-treatable material. These leaf springs are clamped in a pattern so that they are fastened at their ends to two relatively movable pattern members as in the assembled balance. A force is now exerted on one of the pattern members which loads the leaf springs in pure bending so that they are elastically bent to S-shape. The pattern members are fixed in this deflected condition to a frame, base or the like, and inserted in a furnace together with the bent leaf springs, where the latter are heat treated at a suitable temperature. After heat treatment, the pattern with the leaf springs still clamped therein is removed from the furnace and after the leaf springs have cooled they are removed from the pattern. They then have the desired S-shape and can be assembled without further treatment. In order to bend the leaf springs 10, 11 to a more pronounced S than the springs 17, 18, the former are clamped in a pattern the members of which can be relatively more displaced than those for the leaf springs 17, 18. All deviations from the desired S-shape can generally be compensated by the aforementioned adjusting weights when the balance has been assembled.

The spring balance shown diagrammatically in Figs. 1 to 4 can, of course, be provided with suitable setting means for varying the sensitivity. For this purpose additional controllable springs can be mounted in known manner between the pan support 21 and the frame 5, 6, 7. These additional springs can comprise leaf springs having displaceable clamping locations.

The invention is not limited to the particular embodiments here shown and described. Various modifications may be made without departing from the spirit and scope of the invention as set forth in the following claims.

I claim:

1. A spring balance comprising a frame having first and second vertically spaced spring connection points thereon, a vertical intermediate member having vertically spaced first, second, third and fourth spring connection points thereon, a vertical scale pan support having vertically spaced first and second spring connection points thereon, first and second leaf springs connected intermediate said intermediate member and said frame, said first leaf spring being connected at one end to said frame first connection point and at the other end to said intermediate member first connection point and said second leaf spring being connected at one end to said frame second connection point and at the other end to said intermediate member second connection point; and third and fourth leaf springs connected intermediate said intermediate member and said pan support, said third spring being connected at one end to said intermediate member third connection point and at the other end to said pan support first connection point and said fourth spring being connected at one end to said intermediate member fourth connection point and at the other end to said pan support second connection point, each of said leaf springs being flat over the length thereof and initially of a pre-stressed S-shaped configuration when said balance is free of any weight to be measured to cause said pan support first and second connecting points to be at higher elevations, respectively, than said intermediate member third and fourth connecting points and to cause said intermediate member first and second connection points to be at higher elevations, respectively, than said frame first and second connection points whereby when a weight to be measured is applied to the scale pan of said balance said pan support and said intermediate member will be moved downwardly to cause said each of said prestressed leaf springs to be distorted to a normally horizontal configuration.

2. Apparatus as defined in claim 1 wherein each of said flat springs has a rectangular cross-sectional configuration the sides of the longest dimension of which are arranged horizontally.

3. Apparatus as defined in claim 2 wherein said leaf springs are of equal length, and further wherein the distance between said frame first and second spring connection points equals the vertical distance between said intermediate member first and second connection points and the distance between said intermediate member third and fourth connection points equals the distance between said pan support third and fourth connection points, whereby said pan support and said intermediate member will move vertically parallel to a vertical plane containing said frame first and second connection points.

4. The invention as recited in claim 1, wherein said leaf springs acting between said intermediate member and said frame of the balance are pre-bent to a more pronounced S-shape than those acting between said pan support and said intermediate member according to the weight of said intermediate member, so that, irrespective of the load on the scale pan, said leaf springs acting between said intermediate member and said frame are deflected at least approximately equally to said leaf springs acting between said pan support and said intermediate member.

References Cited in the file of this patent

UNITED STATES PATENTS

| | | | |
|---|---|---|---|
| 2,381,086 | Steele | Aug. 7, | 1945 |
| 2,646,274 | Weckerly | July 21, | 1953 |

FOREIGN PATENTS

| | | | |
|---|---|---|---|
| 6,586 | Great Britain | May 30, | 1885 |